United States Patent
Tsiatsikas et al.

(10) Patent No.: US 11,805,399 B2
(45) Date of Patent: Oct. 31, 2023

(54) COMPUTER-IMPLEMENTED METHOD OF OPTIMIZING BANDWIDTH IN A PSAP ENVIRONMENT AND COMMUNICATION NETWORK

(71) Applicant: Unify Patente GmbH & Co. KG, Munich (DE)

(72) Inventors: Zisis Tsiatsikas, Salonika (GR); Eirini Michopanou, Athens (GR); Aikaterini Karanasiou, Hildesheim (DE); Sofia Anagnostou, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 38 days.

(21) Appl. No.: 17/550,149

(22) Filed: Dec. 14, 2021

(65) Prior Publication Data
US 2022/0201457 A1 Jun. 23, 2022

(30) Foreign Application Priority Data
Dec. 18, 2020 (EP) .................................... 20215566

(51) Int. Cl.
*H04W 4/90* (2018.01)
*H04W 76/50* (2018.01)
*H04L 65/1104* (2022.01)
*H04M 3/51* (2006.01)
*H04W 72/543* (2023.01)

(52) U.S. Cl.
CPC ........... *H04W 4/90* (2018.02); *H04L 65/1104* (2022.05); *H04M 3/5116* (2013.01); *H04W 72/543* (2023.01); *H04W 76/50* (2018.02)

(58) Field of Classification Search
CPC ..... H04W 4/90; H04W 76/50; H04W 72/543; H04L 65/1104; H04M 3/5116
USPC ...................................................... 455/404.1
See application file for complete search history.

(56) References Cited

U.S. PATENT DOCUMENTS

| 2014/0005506 | A1* | 1/2014 | Elghazzawi | H04N 7/181 600/324 |
|---|---|---|---|---|
| 2016/0337282 | A1 | 11/2016 | Kallio et al. | |
| 2018/0310159 | A1* | 10/2018 | Katz | H04W 4/50 |
| 2020/0274962 | A1* | 8/2020 | Martin | H04W 4/02 |

OTHER PUBLICATIONS

European Search Report for European Application No. 20215566.9 dated May 11, 2021.

* cited by examiner

*Primary Examiner* — Maria El-Zoobi
(74) *Attorney, Agent, or Firm* — Buchanan Ingersoll & Rooney PC (57) ABSTRACT

A computer-implemented method of optimizing bandwidth in a public safety answering point (PSAP) environment ca n include retrieving content related to emergency incidents from a Social Media (SM) server, feeding the content to a Stream Processing Module having a Machine Learning engine for determining a similarity level between the emergency call and any of the emergency incidents retrieved from the SM server. If the similarity level exceeds a predetermined threshold value, then option for downgrading the emergency call to a call comprising only audio data can be provided. If this downgrade option is selected, the RTP stream of the emergency call can be downgraded to an audio call without any video.

14 Claims, 5 Drawing Sheets

COMPUTER-IMPLEMENTED METHOD OF OPTIMIZING BANDWIDTH IN A PSAP ENVIRONMENT AND COMMUNICATION NETWORK

CROSS-REFERENCE TO RELATED APPLICATION

The present application claims priority to European Patent Application No. EP 20 215 566.9, which was filed on Dec. 18, 2020. The entirety of this European Patent Application is incorporated by reference herein.

FIELD

The present invention relates to a computer-implemented method of optimizing bandwidth in a PSAP environment and a communication network for carrying out the method.

BACKGROUND

As public safety nowadays is a major concern, emergency calling services are gradually evolving, whereby the focus of the relevant standards concentrates on clarity and interoperability. In this respect, the Next Generation 9-1-1 architecture (NG9-1-1) offers a plurality of different options of communication, comprising audio, video calls or images that may be transmitted to a public safety answering point (PSAP). This also means that as the standard evolves and provides increased options of communication to the emergency callers, the bandwidth restriction problem will be increasingly destabilized. That is, when emergency calling centers receive increased volumes of traffic, the available bandwidth must not be restrictive for serving the emergency callers.

SUMMARY

We determined that a bandwidth restriction may become the single point of failure for emergency calling centers. We made this determination based on two major reasons. The first reason pertains to an increased traffic, i.e., an increasing number of emergency calls, triggered e.g. by major emergency incidents. The second reason relates to malicious entities that purposely send a surge of traffic (Distributed denial of service DDoS attacks) to the Emergency Services IP Network (ESInet).

In both of these cases, the emergency calls may require transcoding. Bearing in mind the previously-mentioned cases, it becomes apparent that the bandwidth restriction problem remains a very important issue which may result in the rejection of regular emergency calls.

Therefore, we have developed embodiments for the present invention that can be based on the object to provide a solution for avoiding the above described adverse situation, namely, providing a computer-implemented method of optimizing bandwidth in a PSAP environment as well as a corresponding communication apparatus (e.g. a communication device, a communication system or a communication network) according to which bandwidth restrictions do not impair the handling of emergency calls received at a PSAP.

A computer-implemented method of optimizing bandwidth in a public safety answering point, (PSAP) environment can include a PSAP server can include: receiving a Real Time Processing, (RTP) stream relating to an emergency call comprising video and audio data; retrieving content related to emergency incidents from a Social Media (SM) server; feeding the content to a Stream Processing Module (SPM) comprising a Machine Learning, (ML) engine for determining a similarity level between the emergency call and any of the emergency incidents retrieved from the SM server; and if the similarity level exceeds a predetermined threshold value, then providing an option for downgrading the emergency call to a call comprising only audio data, and if the option is selected, downgrading the RTP stream to an audio only call (e.g. a simple audio call with no video or no other non-audio media).

Embodiments of the method can correlates parts of an examined emergency video call stream to content (i.e., image, video) published on social media and the streams of the active calls in the PSAP. Thereby, it can be possible to optimize the network resources and save bandwidth for emergency calls which otherwise would have gone unserved from the emergency service.

For example, if a call taker in the PSAP receives a video call, he or she will be assisted to identify the level of correlation between the emergency video call and the verified emergency content in the social media (i.e., images, video). If this correlation presents a satisfying degree of similarity, then the call taker may downgrade the call to a simple audio call with the aim to save resources on the PSAP side. However, if similarity between the emergency video call and the social media content is not sufficient, i.e. it is below a predetermined threshold value, then the video call will be maintained so that no information will be lost in this case.

According to a preferred embodiment of the invention, if the similarity level is below the predetermined threshold value, then the emergency call comprising video and audio data is maintained.

Embodiments of the method can include other steps. For example, embodiments can include a re-negotiation step for returning, after the downgrading to a simple audio call, to a call comprising video and audio data. As another example, embodiments of the method can also include a step of initially filtering the network traffic for identifying, if the received RTP stream related to the emergency call requires transcoding and can also include a transcoding step for emergency calls that cannot be directly connected to the PSAP.

Embodiments of the method can include training phase, in which the SPM retrieves content related to emergency incidents from the SM server and/or from other sources of information and/or from the PSAP database. In the training phase, the PSAP, for annotating a video and/or an image posted on social media and retrieved from the SM server, may define several visual features per frame or shot, which train an HIVIM algorithm so as to determine whether a post refers to an emergency incident or not. In some embodiments, the visual features comprise color, shots, and object-based features. Moreover, it can be advantageous for some embodiments if the content related to emergency incidents comprises images and/or videos and/or location data and/or the date of the corresponding posts.

The method may further comprise a step of forwarding, if the similarity level for an emergency incident retrieved from the SM server and/or from other sources of information exceeds the predetermined threshold value, the data related to the emergency incident. For example, the image and/or the video and/or the location data and/or the date of the corresponding post can be retrieved from the PSAP to a call taker handling the emergency call.

Embodiments of the method can also include retrieving data related to emergency incidents posted on social media and stored on the SM server and/or from other sources of information periodically, and storing the retrieved data on the database of the PSAP.

Moreover, according to the present invention, a communication apparatus is provided that can implement or carry out embodiments of the method. Embodiments of the apparatus can include a communication device, a computer device, a communication system or a communication network that is adapted to carry out the computer-implemented method of optimizing bandwidth in a PSAP environment. Some embodiments of such an apparatus can include one or more telecommunication devices, such as, for example, a Session Border Controller (SBC), an Emergency Service Routing Proxy (ESRP), a Public Safety Answering Point (PSAP), at least one Social Media (SM) server, and a Media Server (MS).

In some embodiments, a call taker in a PSAP can be in position to downgrade a video call to a simple audio call with the aim to save the system resources on the PSAP side. At the same time, the call taker is in position to inspect the relevant retrieved content in order to acquire a better understanding of the emergency situation. Namely, for an emergency incident notified by a caller by means of a RTP stream comprising video and audio data, the call taker, by exploiting video content and the like published on social media for exactly the same emergency incident may not need the additional video data from the emergency call of the caller. Therefore, the call taker may downgrade the emergency call to audio only and save bandwidth which can be used for further emergency calls.

For the verification of the similarity of an emergency incident posted on social media and an emergency incident reported by means of a video call, a ML engine which can retrieve the emergency posts content, e.g., videos and images, compares them to the streams of the examined call. Besides the retrieved content, the RTP streams of the other established emergency calls may be used for feeding the ML engine in the training phase. Moreover, other sources of information may be exploited as well for this reason.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Reference numerals used in the drawings include the following:
1 communication network
2 SBC
3 ESRP
4 PSAP
5 SM server
6 MS
7 SPM
8 other sources of information
9 caller
10 call taker
11 ML engine

DETAILED DESCRIPTION

Figure 1:
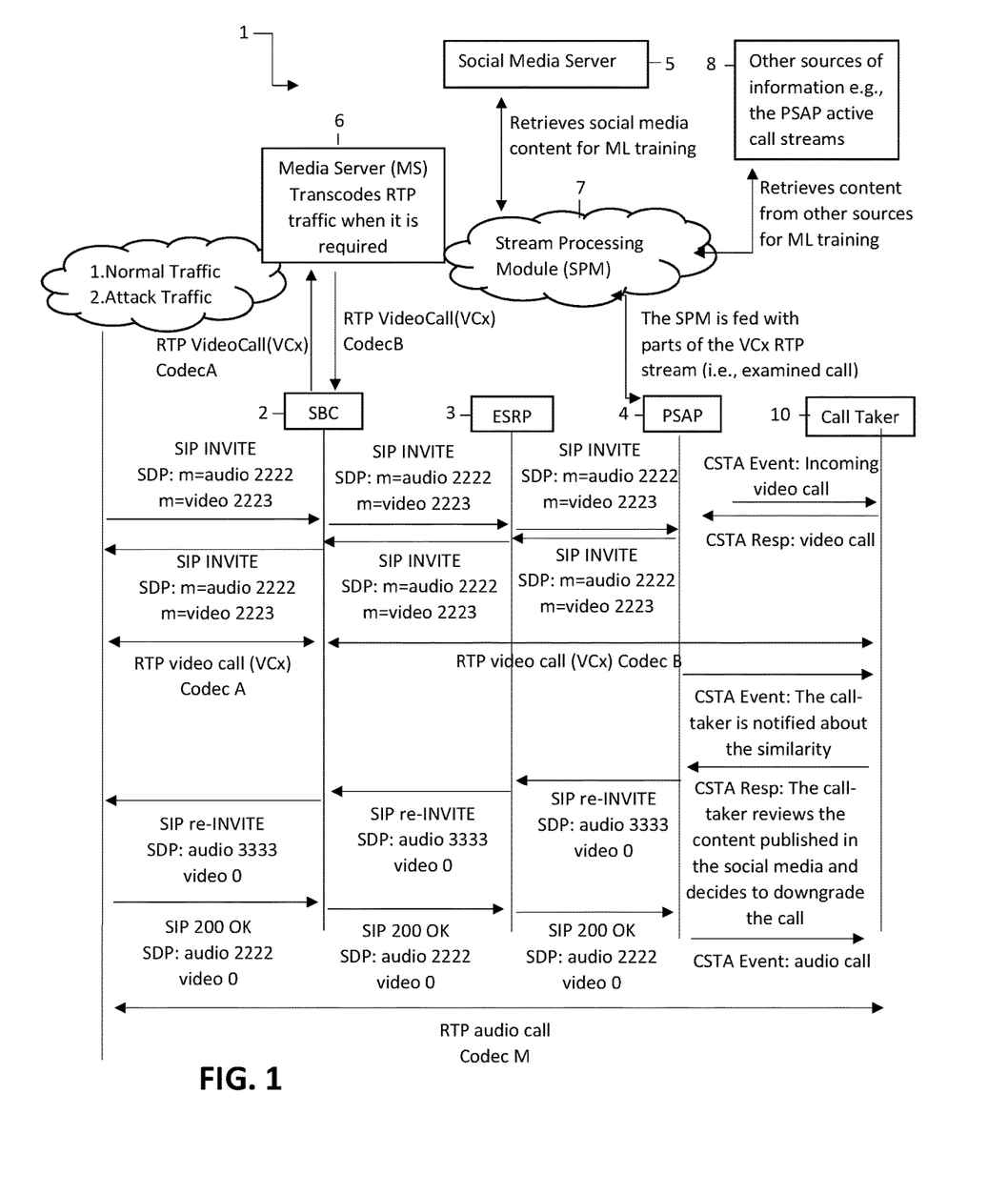
FIG. 1 schematically shows an exemplary process of optimizing bandwidth in a PSAP environment to account for normal traffic and attack traffic conditions in an exemplary embodiment of a communication apparatus.

FIG. 1 schematically shows an overview of the interactions between network entities of an exemplary communication apparatus, which can be configured as a communication network 1 according to an embodiment of the invention. Namely, the network entities in the embodiment shown here comprise a Session Border Controller (SBC) 2, the Emergency Service Routing Proxy (ESRP) 3, the Public Safety Answering Point (PSAP) 4, the Social Media (SM) server 5, and the Media Server (MS) 6. It should be appreciated that each of these entities is a type of telecommunication device that can include at least one computer device. Each telecommunication device can include at least one processor connected to a non-transitory memory and at least one transceiver. The memory can have code or an application stored thereon that defines a method that is performed by the telecommunications device when its processor runs the code or application. Each telecommunication device can also include a display, one or more input devices, and one or more output devices that can be connected to its processor. Each telecommunication device can also include other hardware.

At first, the SBC 2 performs a first filtering procedure of the network traffic. Usually, a basic security filtering mechanism (e.g., counting the suspicion level of the emergency calls, etc.) may be applied for this procedure. Additionally, the MS 6 communicates with the SBC 2 in order to provide transcoding functionality for the devices, which cannot be connected to the call taker 10 directly due to media restrictions. It is noted that according to another embodiment, the transcoding functionality may also be realized by the SBC 2.

However, in the embodiment shown here, the MS 6 is a separate entity. That is, the MS 6 can communicate directly with the SBC 2 and provides the transcoding functionality. Moreover, it is noted that according to the embodiment shown in FIG. 1, the MS 6 is not needed for re-negotiating the media between the caller 9 (see FIG. 3) and the call taker 10 either in case of downgrading a video call to a simple audio call, or for returning to the video call from an audio stream. It is further noted that the MS 6 could be installed so as to communicate directly with the ESRP 3 and/or the PSAP 4.

After the first filtering procedure by the SBC 2, the call is routed to the ESRP 3 and the PSAP 4. The latter forwards the call to the call taker 10 using signaling messages; in the embodiment shown here, these would be SIP messages, and the caller connects to the call taker 10.

In the illustrated embodiment, it is assumed that the traffic arriving at the SBC 2 comprises normal traffic and/or attack traffic. For these two types of traffic, a first filtering mechanism is applied on the SBC 2 which verifies if the RTP stream requires transcoding. If so, the SBC 2 forwards the RTP stream to the MS 6. The MS 6 transcodes the stream and forwards the traffic back to SBC 2. Subsequently, the RTP stream is forwarded in the ESRP 3 and PSAP 4 elements.

Moreover, a SM server 5 communicates with the PSAP 4 server. The SM server 5 can be used by the PSAP 4 server in order to retrieve content related to emergency incidents. According to the illustrated embodiment, a direct communication link between the social media server 5 and the PSAP 4 server is established. According to further embodiments, alternative links of communication could be implemented for the social media server 5. Such links could be established so as to directly connect the SBC 2 and/or the ESRP 3 elements to the social media server 5.

The retrieved social media content is fed into the Machine Learning ML engine 11 (see FIG. 3) of the Stream Processing Module (SPM) 7, as the SPM 7 provides the ML training and classification functionality. As to the training phase, the SPM 7 retrieves content related to emergency incidents from social media or other sources of information 8. According to the illustrated embodiment, the database DB of the PSAP 4 is considered as such a different source of information. Besides a PSAP 4 DB standard functionality, according to the illustrated embodiment, parts of the RTP stream of the active emergency calls in the same PSAP 4 element are also stored in this DB. It is noted that active emergency calls, in this context, are considered as calls which have been established with the PSAP 4 in a predetermined time range $t_1$-$t_n$ from the current examined call. This range is configurable and the service provider may be responsible for selecting the appropriate values.

In the classification and correlation phase mentioned above, a part of the RTP stream is fed to the SPM 7 for verifying if there is a similarity level between the current examined call and the verified emergency incidents retrieved from the social media or social media server 5, or media retrieved from other sources of information 8, i.e., the RTP stream from other active calls in the PSAP 4. In case there is an increased level of similarity, for example, if the level of similarity exceeds a predetermined threshold, the call taker 10 is presented with a notification followed by the relevant content (i.e., images, videos, etc.) retrieved from the social media server 5 or from other sources of information 8.

Finally, the call taker 10 is presented with an option to downgrade the call for saving resources. If the call taker 10 selects to downgrade the call, then the a Computer Supported Telecommunications Application CSTA event will be generated from the corresponding application, for example, GEMMA, in order to convey the downgrading selection to the PSAP 4. The latter will generate a SIP re-INVITE request. This request will be sent towards the emergency caller by conveying the Session Description Protocol SDP offer indicating a switch over to a simple audio call. The emergency caller will respond with a SIP 200 OK response conveying the relevant SDP response. After the re-negotiation phase, the RTP stream will be downgraded to a simple audio call. At any time, the call taker 10 will be in position to switch back to the video call using a selection from the application. This option can be provided for the call taker 10 using, for example, a front-end button which is part of the application (e.g., GEMMA). The call taker selection will again trigger a CSTA event which will generate a SIP re-INVITE request conveying the relevant information in the SIP message body. The emergency caller will respond to this SDP offer accordingly, and in case there is a successful negotiation, the call will be switched back to video-call.

It should be appreciated that the emergency call can initiate a call via a smart phone, tablet or other type of communication terminal that can provide a video call or other type of call (e.g. VoIP video call, etc.). The emergency caller's communication terminal can include a processor connected to a non-transitory memory and at least one transceiver. Each terminal devices can also include a display and can also include input devices (e.g. buttons, a stylus, etc.).

Figure 2:
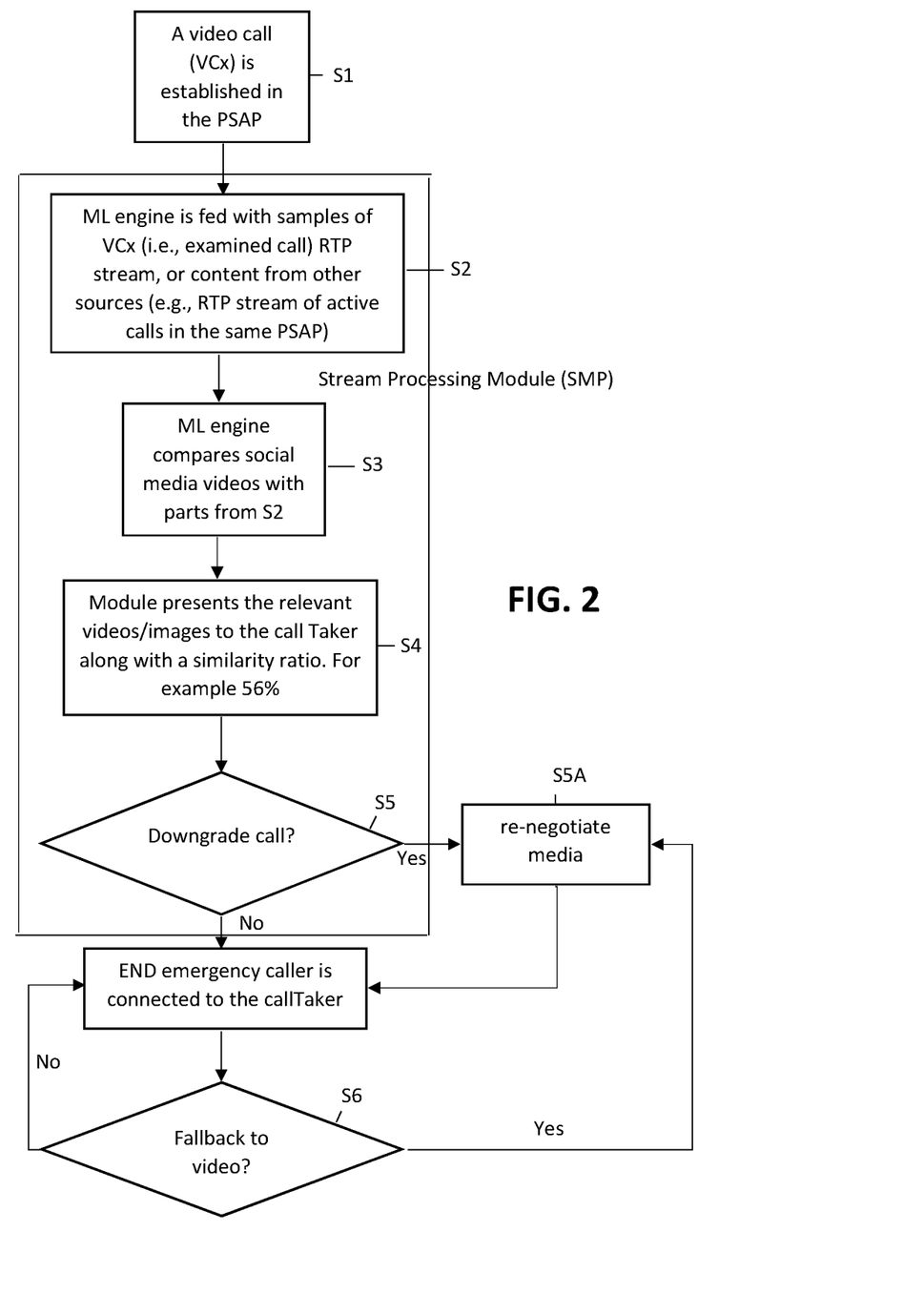
FIG. 2 shows a flowchart of an exemplary embodiment of the computer-implemented method of optimizing bandwidth in a PSAP environment.

FIG. 2 shows a flowchart of an exemplary method of optimizing bandwidth in a PSAP environment according to an embodiment. In a first step S1, an emergency video call is received at the PSAP 4 (see FIG. 1). The call taker 10 accepts the call and the video call stream (see FIG. 3) transmits the relevant audio and video information from the caller 9 to the call taker 10 (see FIG. 1). The PSAP 4 server initiates the stream processing module (SPM 7, see FIG. 1) so as to retrieve pieces of RTP packets, in the form of samples. For example, every random and independent sample may have a predetermined duration of X seconds. In the second step S2, these samples are fed into the Machine Learning, ML, engine, in order to find the similarity between the emergency call stream and the media, i.e., the images and/or videos presented in the verified social media posts(s)). The ML engine is implemented for identifying if these image/video contents are related to the emergency call. After performing the comparison in step S3, the SPM 7 will present a similarity level to the emergency call taker 10. Additionally, the SPM 7 will present the corresponding media content parts which resemble the actual call. Following this approach, the call taker 10 is assisted with the relevant image and/or video content. After that, for example, if the similarity level exceeds a predetermined threshold value, then an option appears for the call taker 10 to downgrade the call to simple audio. If the call taker 10 accepts this option, then the call will be downgraded to a simple audio call. If the call taker 10 denies to downgrade the call, then the stream will remain as it is. The same will happen in case the ML engine returns a negative response or a similarity ratio which is zeroed for the level of correlation between the video call stream and the social media content. Even if the call taker 10 selects to downgrade the call, they will have the option of returning to the original audio and video stream at any time.

It is noted that according to the embodiment described, data (such as video, date of posts, location of user) that has been published on social media and/or other sources of information is retrieved periodically. The data is stored temporarily on database DB of the PSAP 4. In addition, a machine learning model is combined with features of extracted data in order to determine, if posts are related to an emergency situation or not. After applying a machine learning model, the social media posts that are not relevant to emergency events are removed again from PSAP DB. Also, geolocation data of all active video calls is stored on PSAP DB. The geolocation data may be extracted by examining Call Details Records, CDRs, and the IP address of VOIP phones or by collecting data from social networking services and from records of apps of users' mobile phones.

With respect to the machine learning technique, the following is noted. For annotating a video clip as emergency event, the PSAP 4 defines several visual features per frame or shot, which train Hidden Markov Model HMM algorithm to determine whether a post refers to an emergency event or not. Thus, according to the method of optimizing bandwidth in a PSAP environment some of the following features can be defined:

Color: Each pixel of frame is represented by a set of values from RGB (red-green-blue) color space. A color histogram (number of pixels for each color) is used for comparing two frames of videos.

Shots: Shots may be detected and annotated by estimating the difference of the color histograms of continuous frames. In particular, it will be verified whether a shot has been changed based on a threshold.

Object-based feature: Features such as color, texture and size are extracted by specific objects (for example fires, smoke or flood).

Further, it is noted that open source tools may be used for developing and training ML models for video classification such as TensorFlow and Keras.

Thus, during the call, the PSAP 4 uses results of ML model for identifying, if the video of an emergency event is already published on social media pages. In addition, a similarity model may be used, which finds all the occurrences of similar video clips in the PSAP 4 DB for a given sample of video stream. Thereby, the current video call is compared to videos of social media posts and other sources of information, for instance, other active video calls in the same PSAP element, and the results (videos with similarity ratio) are presented to the call taker 10.

As to the similarity model, it is assumed that the video streams are separated into segments comprising shots (i.e., the sequence of frames), wherein each shot is represented by features such as color, texture, motion or shape (the representation is based on a sequence of symbols). In case of a comparison among active calls, geolocation data is also used as input feature of similarity model method.

In addition, a longest substring matching algorithm is applied so as to find similar shots among video clips. In particular, the algorithm finds the number of frames that match between two shots. Using a threshold, it decides whether a shot is equal to another. A similarity search tool that may be used for the video search is the Faiss library, which is a library for efficient similarity search and clustering of dense vectors. It contains algorithms that search in sets of vectors of any size, up to ones that possibly do not fit in RAM and it also contains supporting code for evaluation and parameter tuning.

Further, for classifying and searching videos, a match-and-tiling approach to content-based video retrieval, as proposed by Liping Chen and Tat-Seng Chua, may be applied, which approach considers video similarity matching at two levels, namely, the shot and sequence levels. According to this approach, at the shot level, the matching of similar shots is transformed into a problem of matching video feature trajectories using a longest sub-sequence matching technique, whereas at the sequence level, sequence matching is viewed as a clustering problem wherein an effective sliding window algorithm is applied to locate multi-occurrences of similar video sequences in the database. Thus, both exact and similar video sequences with different durations and shot ordering may be retrieved.

Returning to the flowchart of FIG. 2, in step S4, an application for monitoring calls (for instance, Gemma) presents a list comprising video/images and the similarity percentage of each video/image with the current video call on the call taker's screen, who then reviews the list with relevant videos and decides, if the video call should be dropped whereby the audio call will be maintained (step S5). For example, for cases with videos exhibiting a similarity level that exceeds a predetermined threshold value (for example a percentage above e.g. 56% or another preselected percentage threshold value), the call taker 10 may downgrade the call, since it is obvious that two videos relate to the same event. Then, the current video call is stored and may be fed to the ML algorithm. It is noted that a video classifier could provide more accurate results on future calls. However, if the call taker 10 maintains the video call, the similarity method continues to check for relevant videos every few minutes (step S6).

Figure 3:
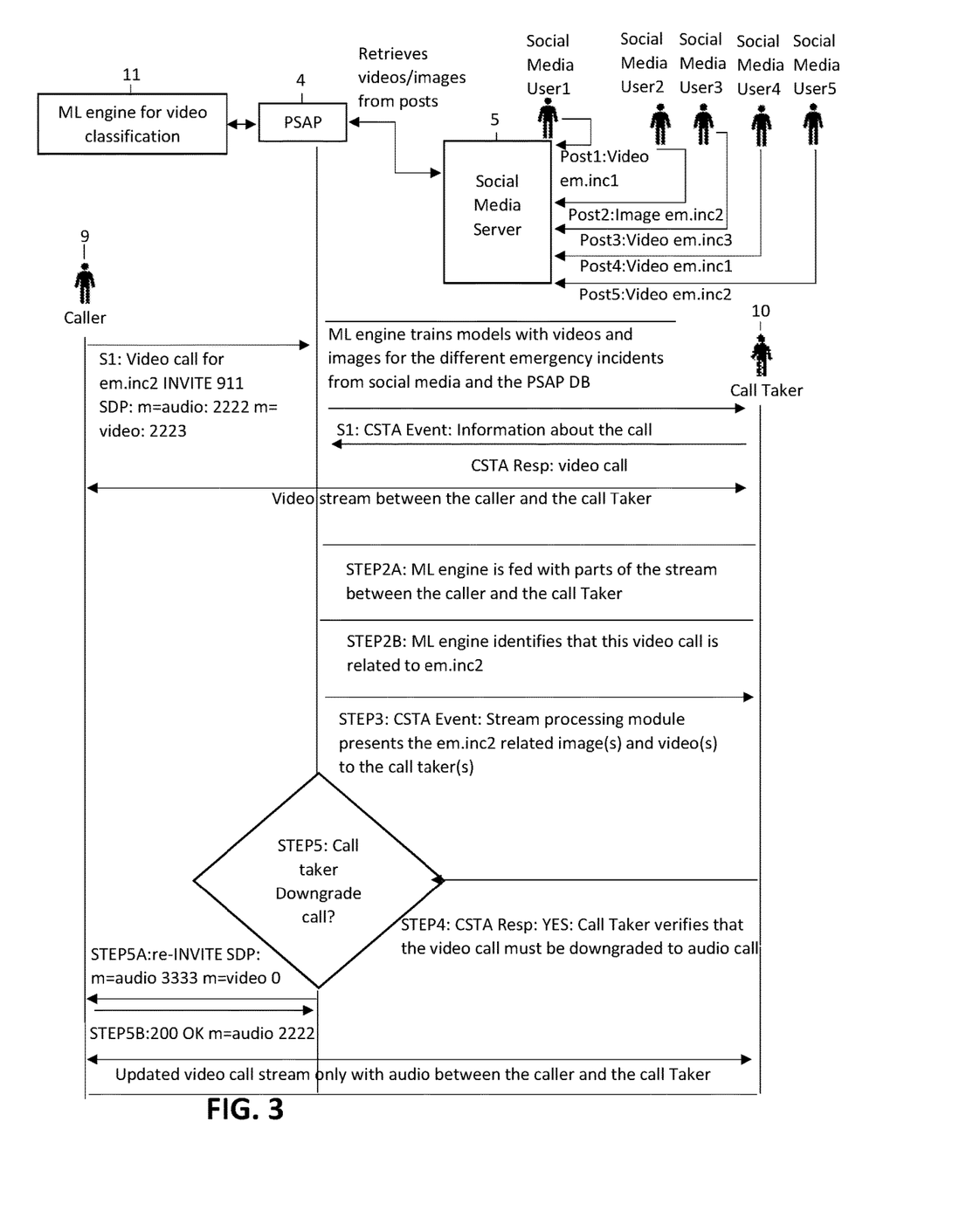
FIG. 3 schematically illustrates an exemplary embodiment of the procedure of the computer-implemented method of optimizing bandwidth in a PSAP environment for a first exemplary scenario.

FIG. 3 illustrates the procedure of the method of optimizing bandwidth in a PSAP environment according to an embodiment of the invention for a first scenario. In this embodiment, a normal case to downgrade the video call to simple audio stream is dealt with. Namely, here, it is assumed that an emergency video call has already been established and two related emergency posts, out of five, are retrieved from the social media server (SM server 5, see FIG. 1). These posts comprise photos and videos with respect to the same emergency incident as the one shown and described in the video call.

For analyzing this example, asynchronous training of various ML classifiers using the various data retrieved from the social media (i.e., fed with images and videos) and other sources of information (reference numeral 8, see FIG. 1) is applied. A first filtering mechanism feeds ML classifiers using the above data. In a first step, STEP1, a caller initiates a video call to the PSAP 4. The call taker 10 accepts the call and the two parties communicate using audio and video. In STEP2, the ML engine 11 is fed with parts of the video stream between the caller 9 and the call taker 10. The ML engine 11 identifies that this call is related to an emergency incident. The Stream processing module, SPM 7 (see FIG. 1) presents the em.inc2 related image and video, retrieved from the social media, to the call taker (i.e. STEP3). The call taker 10 has now the option to downgrade the call to a simple audio call (i.e. STEP4). Thus, in STEP5 the call taker 10 verifies that they want to downgrade the call to a simple audio call and a bunch of signalling messages re-negotiate the stream to a simple audio call.

Figure 4:
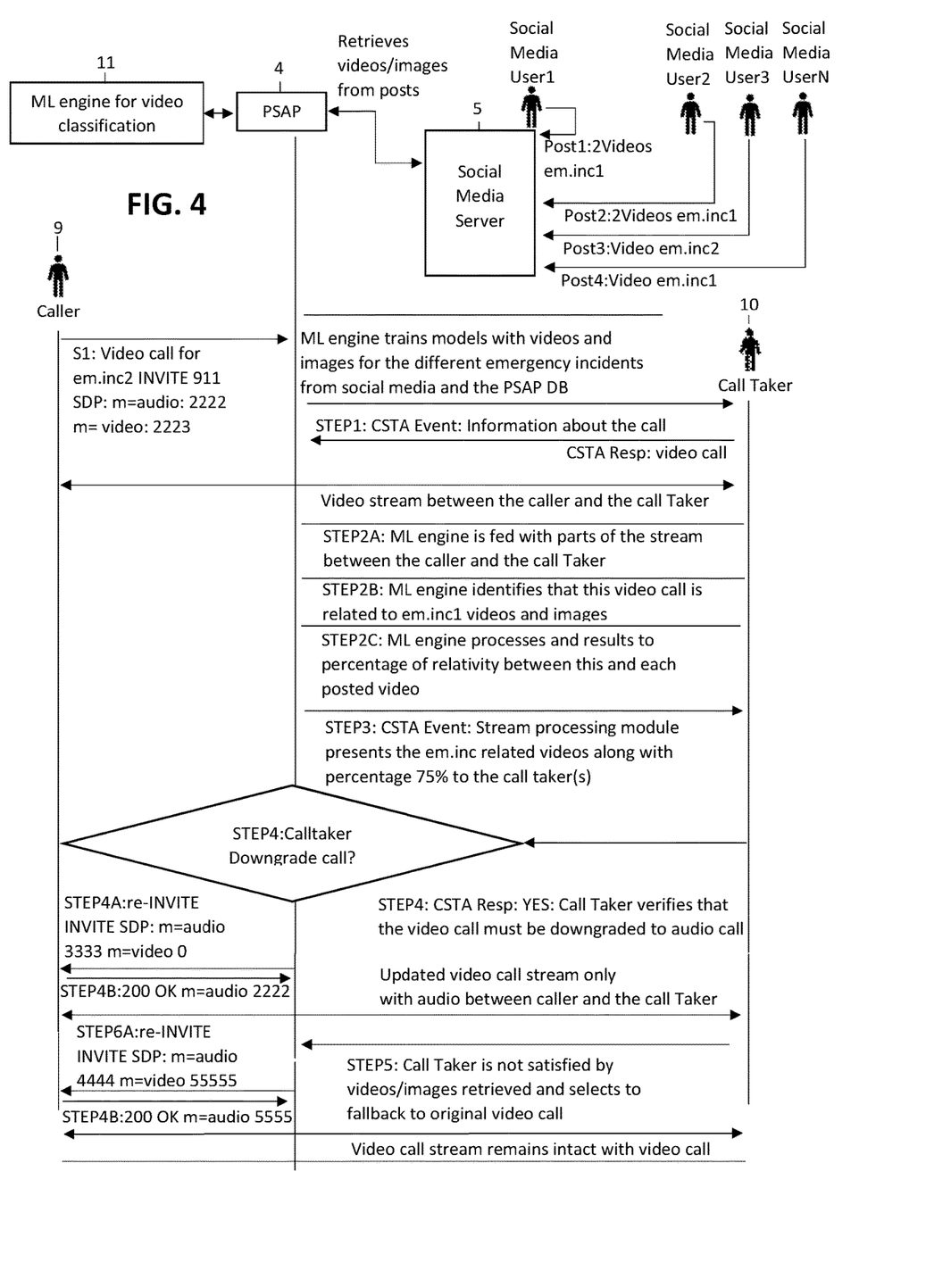
FIG. 4 illustrates an exemplary embodiment of the procedure of the computer-implemented method of optimizing bandwidth in a PSAP environment for a second exemplary scenario.

FIG. 4 illustrates the procedure of an embodiment of the method of optimizing bandwidth in a PSAP environment according to an embodiment of the invention for a second scenario, According to this scenario, it is decided to use to the original video call. Accordingly, here, it is assumed that an emergency video call arrives and three related emergency posts, out of four, are retrieved from the social media server 5. The ML classifiers are asynchronously trained as suggested according to the scenario described with respect to FIG. 3. Some of the posts retrieved from social media server 5 comprise photos and videos with respect to the same emergency incident as the video call to be served. Thus, in STEP1, an emergency video call arrives and is accepted by the PSAP 4 call taker 10. Then, in STEPS 2A-2C parts of the video call stream are fed to the ML engine 11, which in turn, calculates a similarity of 75% between the caller's video and photos/videos from the verified emergency posts (i.e. STEP3). The call taker 10 accepts a proposal to downgrade the call to audio only (i.e. STEP4), and a new audio stream is established. However, a case may occur according to which a decision is made that the retrieved resources are not satisfying in order to serve the call effectively. As a consequence, it is decided to return to the original media of the call (i.e. STEP5).

Figure 5:
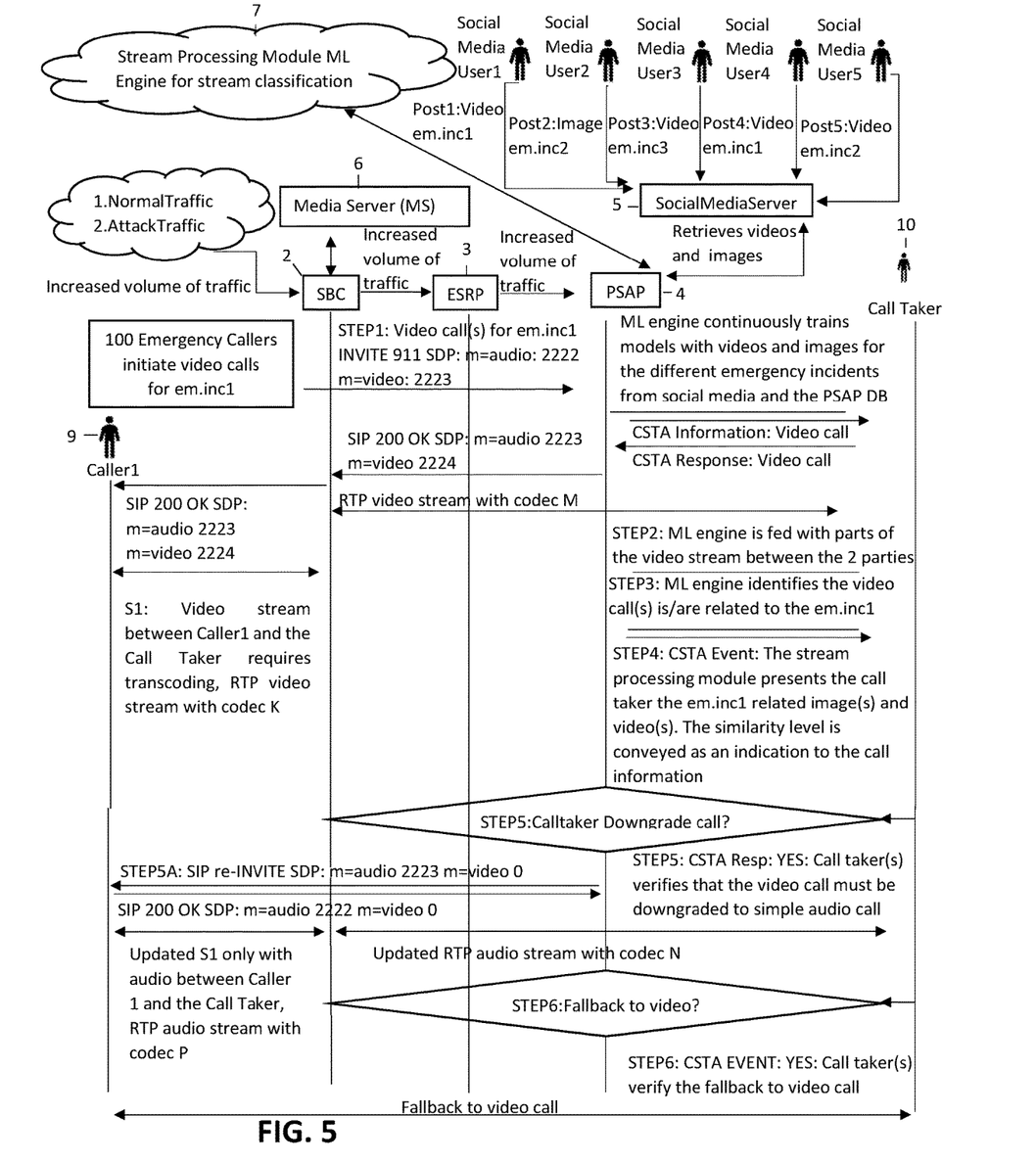
FIG. 5 illustrates an exemplary embodiment of the procedure of the computer-implemented method of optimizing bandwidth in a PSAP environment for a third exemplary scenario.

FIG. 5 illustrates the procedure of an embodiment of the method of optimizing bandwidth in a PSAP environment according to an embodiment of the invention for a third scenario. Here, an incoming call with non-supported codec during heavy traffic for a major incident is received at the PSAP 4. In this scenario, it is assumed that a caller makes an emergency video call to report a major incident. Further, in this scenario, it is assumed that the system is very busy due to many parallel calls for the same incident. Additionally, the traffic consists of normal and attack messages which may require transcoding. The overhead and the limited condition of the different network elements is illustrated using dotted lines.

It is noted that the MS 6 (see FIG. 1) is utilized so as to be able to connect every emergency call to the PSAP 4 in case the caller 9 cannot be connected directly to the call taker 10. If a call, either part of normal traffic or attack traffic, needs transcoding, this operation has to be executed by the MS 6. The latter increases the computational cost in the ESInet and transcoding may be applied either on the audio or on the audio/video stream. The dimension of the transcoding computational cost can be reduced by implementing the described method. That is, after downgrading a video call, the bandwidth and the computational cost will be reduced accordingly.

The SPM 7 continuously retrieves videos/images from social media 5 and other sources of information 8, e.g., active calls that take place in the same PSAP 4 at that time (i.e., active calls on a configurable time range $[t_1\text{-}t_x]$) with the aim to train ML models.

In STEP1, the caller 9 initiates the video call with a codec 'K'. Once the call reaches the SBC 2 element, it is detected that this codec is not supported by the solution, and therefore, a transcoding operation takes place and the caller's RTP stream is encoded using the updated codec 'M'. The RTP stream is routed through the ESRP 3 and PSAP 4 elements in order to reach the call-taker 10. Part of the RTP stream of the examined call is fed in the SPM 7 module for classification, i.e., STEPS2,3.

In STEP4, the call taker 10 is indicated via a CSTA application, with the similarity percentage between this call's video and the content retrieved from the SPM 7. The retrieved content and the similarity level are presented to the call-taker 10 using a front-end implementation on the corresponding application, say for example the GEMMA.

In STEP5 the call taker 10 decides to downgrade the call using a selection in the front-end implementation of the corresponding application. The call is downgraded to a simple audio call (e.g. no video is included in the call, no non-audio media is included in the call, etc.), and the RTP stream is updated accordingly. The option to revert to video stream is always available for the call taker 10 in the form of a button in the front-end implementation of the corresponding application, i.e., STEP6. It is noted that in STEP5 and STEP6, the information between the PSAP 4 and the application is conveyed using the CSTA protocol.

It should be appreciated that different embodiments of the method, system, a PSAP, ESRP, SM server, MS, SBC, and an apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of optimizing bandwidth in a public safety answering point (PSAP) environment comprising a PSAP server having a processor connected to a non-transitory computer readable medium, wherein the method comprises:
  receiving a Real Time Processing (RTP), stream relating to an emergency call comprising video data and audio data;
  retrieving content related to emergency incidents from a Social Media (SM) server;
  feeding the content to a Stream Processing Module (SPM) comprising a Machine Learning (ML) engine for determining a similarity level between the emergency call and any of the emergency incidents retrieved from the SM server; and
  in response to the similarity level exceeding a predetermined threshold value, providing an option for downgrading the emergency call to a call comprising only audio data, and
  in response to the option being selected, downgrading the RTP stream to an audio only call.

2. The method of claim 1, comprising:
  in response to the similarity level being below the predetermined threshold value, then the emergency call comprising video data and audio data being maintained.

3. A computer-implemented method of optimizing bandwidth in a public safety answering point (PSAP) environment comprising a PSAP server having a processor connected to a non-transitory computer readable medium, wherein the method comprises:
  receiving a Real Time Processing (RTP), stream relating to an emergency call comprising video data and audio data;
  retrieving content related to emergency incidents from a Social Media (SM) server;
  feeding the content to a Stream Processing Module (SPM) comprising a Machine Learning (ML) engine for determining a similarity level between the emergency call and any of the emergency incidents retrieved from the SM server;
  in response to the similarity level being below the predetermined threshold value, then the emergency call comprising video data and audio data being maintained;
  in response to the similarity level exceeding a predetermined threshold value, providing an option for downgrading the emergency call to a call comprising only audio data, and
  in response to the option being selected, downgrading the RTP stream to an audio only call;
  after the downgrading to the audio only call, negotiating to adjust the audio only call to a call comprising video data and audio data.

4. The method of claim 3, comprising:
initially filtering network traffic for identifying whether the received RTP stream related to the emergency call requires transcoding.

5. The method of claim 4 comprising:
transcoding emergency calls that cannot be directly connected to the PSAP server.

6. The method of claim 2, comprising: A computer-implemented method of optimizing bandwidth in a public safety answering point (PSAP) environment comprising a PSAP server having a processor connected to a non-transitory computer readable medium, wherein the method comprises:
receiving a Real Time Processing (RTP), stream relating to an emergency call comprising video data and audio data;
retrieving content related to emergency incidents from a Social Media (SM) server;
feeding the content to a Stream Processing Module (SPM) comprising a Machine Learning (ML) engine for determining a similarity level between the emergency call and any of the emergency incidents retrieved from the SM server;
in response to the similarity level being below the predetermined threshold value, then the emergency call comprising video data and audio data being maintained;
in response to the similarity level exceeding a predetermined threshold value, providing an option for downgrading the emergency call to a call comprising only audio data, and
in response to the option being selected, downgrading the RTP stream to an audio only call;
performing a training phase in which the SPM retrieves content related to emergency incidents from the SM server and/or from other sources of information and/or from a database of the PSAP.

7. The method of claim 6, wherein in the training phase includes:
annotating a video and/or an image posted on social media and retrieved from the SM server to define several visual features per frame or shot which train a Hidden Markov Model (HMM) algorithm so as to determine whether a post refers to an emergency incident or not.

8. The method of claim 7, wherein the visual features comprise color, shots, and object-based features.

9. The method of claim 6, wherein the content related to emergency incidents comprises images and/or videos and/or location data and/or dates of the corresponding posts.

10. The method of claim 9, comprising:
in response to the similarity level for an emergency incident retrieved from the SM server and/or from other sources of information exceeding the predetermined threshold value, forwarding the data related to the emergency incident from the PSAP server to a call taker handling the emergency call.

11. The method of claim 10, wherein the data related to the emergency incident comprises an image and/or the video and/or the location data and/or the date of the corresponding post.

12. A computer-implemented method of optimizing bandwidth in a public safety answering point (PSAP) environment comprising a PSAP server having a processor connected to a non-transitory computer readable medium, wherein the method comprises:
receiving a Real Time Processing (RTP), stream relating to an emergency call comprising video data and audio data;
retrieving content related to emergency incidents from a Social Media (SM) server;
feeding the content to a Stream Processing Module (SPM) comprising a Machine Learning (ML) engine for determining a similarity level between the emergency call and any of the emergency incidents retrieved from the SM server;
in response to the similarity level exceeding a predetermined threshold value, providing an option for downgrading the emergency call to a call comprising only audio data,
in response to the option being selected, downgrading the RTP stream to an audio only call; and
retrieving data related to emergency incidents posted on social media and stored on the SM server and/or from other sources of information periodically, and storing the retrieved data on a database of the PSAP.

13. A communication apparatus comprising a telecommunication device adapted to carry out a computer-implemented method of optimizing bandwidth in a public safety answering point, (PSAP), wherein the communication apparatus comprises:
a telecommunication device having a processor connected to a non-transitory memory, the non-transitory memory having code stored thereon that defines a method performed by the telecommunication device when the processor runs the code, the method comprising:
receiving a Real Time Processing (RTP), stream relating to an emergency call comprising video data and audio data;
retrieving content related to emergency incidents from a Social Media (SM) server;
feeding the content to a Stream Processing Module (SPM) comprising a Machine Learning (ML) engine for determining a similarity level between the emergency call and any of the emergency incidents retrieved from the SM server;
in response to the similarity level being below the predetermined threshold value, then the emergency call comprising video data and audio data being maintained;
in response to the similarity level exceeding a predetermined threshold value, providing an option for downgrading the emergency call to a call comprising only audio data; and
in response to the option being selected, downgrading the RTP stream to an audio only call; and
after the downgrading to the audio only call, negotiating to adjust the audio only call to a call comprising video data and audio data.

14. The communication apparatus of claim 13, wherein the apparatus is configured as a communication network comprising at least one of: a Session Border Controller (SBC), an Emergency Service Routing Proxy (ESRP), a PSAP server, at least one Social Media server, and a Media Server.

* * * * *

UNITED STATES PATENT AND TRADEMARK OFFICE
CERTIFICATE OF CORRECTION

PATENT NO. : 11,805,399 B2
APPLICATION NO. : 17/550149
DATED : October 31, 2023
INVENTOR(S) : Zisis Tsiatsikas et al.

Page 1 of 1

It is certified that error appears in the above-identified patent and that said Letters Patent is hereby corrected as shown below:

In the Claims

Column 11, Line 8 - delete the following text: "The method of claim 2, comprising:".

Signed and Sealed this
Second Day of January, 2024

Katherine Kelly Vidal
*Director of the United States Patent and Trademark Office*